United States Patent
Liu et al.

(10) Patent No.: US 10,049,509 B1
(45) Date of Patent: Aug. 14, 2018

(54) SYSTEM AND METHOD FOR TRANSMITTING APPARATUS-RELATED INFORMATION IN REAL TIME

(71) Applicants: Chifu Liu, Taipei (TW); Chao-Yuan Lai, Taipei (TW); Hungli Tan, Taipei (TW)

(72) Inventors: Chifu Liu, Taipei (TW); Chao-Yuan Lai, Taipei (TW); Hungli Tan, Taipei (TW)

( * ) Notice: Subject to any disclaimer, the term of this patent is extended or adjusted under 35 U.S.C. 154(b) by 0 days.

(21) Appl. No.: 15/653,939

(22) Filed: Jul. 19, 2017

(30) Foreign Application Priority Data

May 16, 2017 (TW) .............................. 106116144 A (51) Int. Cl.
| | | |
|---|---|---|
| *G07C 5/00* | (2006.01) | |
| *G08B 26/00* | (2006.01) | |
| *G08B 23/00* | (2006.01) | |
| *G08B 27/00* | (2006.01) | |
| G08B 25/14 | (2006.01) | |
| G08B 3/10 | (2006.01) | |
| G06F 11/07 | (2006.01) | |

(52) U.S. Cl.
CPC ............. *G07C 5/008* (2013.01); *G08B 23/00* (2013.01); *G08B 26/003* (2013.01); *G08B 27/00* (2013.01); *G06F 11/0772* (2013.01); *G08B 3/10* (2013.01); *G08B 25/14* (2013.01)

(58) Field of Classification Search
CPC ........ G08B 23/00; G08B 27/00; G08B 26/00; G08B 26/003; G06F 9/542; G07C 5/008
See application file for complete search history.

(56) References Cited

U.S. PATENT DOCUMENTS

| | | | | |
|---|---|---|---|---|
| 2002/0113877 | A1* | 8/2002 | Welch | B66B 27/00 348/148 |
| 2005/0172304 | A1* | 8/2005 | Tavares | G06F 9/542 719/318 |
| 2008/0086509 | A1* | 4/2008 | Wallace | G06Q 10/10 |
| 2008/0249791 | A1* | 10/2008 | Iyer | G06Q 10/06 705/1.1 |
| 2017/0302741 | A1* | 10/2017 | Conner | H04L 67/125 |

* cited by examiner

Primary Examiner — Andrew Bee (57) ABSTRACT

The present invention provides a system and method for transmitting apparatus-related information in real time. The system comprises at least one server in signal communication with at least one external apparatus in a wired or wireless way. While an abnormality of an external apparatus occurs, the external apparatus transmits a set of abnormality information to the server. After an information receiving interface of the server receives the set of abnormality information transmitted by the external apparatus, an information processing module vocally broadcasts the set of abnormality information. An information transmitting module transmits the set of abnormality information to the client device of at least one assigned related person. While an external apparatus suffers abnormality, the system can inform the related persons in real time to repair the external apparatus instantly.

20 Claims, 5 Drawing Sheets

SYSTEM AND METHOD FOR TRANSMITTING APPARATUS-RELATED INFORMATION IN REAL TIME

This application claims priority for Taiwan patent application no. 106116144 filed on May 16, 2017, the content of which is incorporated by reference in its entirely.

BACKGROUND OF THE INVENTION

Field of the Invention

The present invention relates to a real-time notification system, particularly to system and method for transmitting apparatus-related information in real time.

Description of the Related Art

With advance of science, industries become more and more dependent on network communication devices, servers, mechanization devices, etc. Failure of equipment may disable the operation of an industry, such as shut down a production line or disconnect a network. Therefore, it is very important to effectively administrate multitudinous apparatuses, repair the failed apparatuses as soon as possible, and monitor the failure frequency and the maintenance status of each apparatus.

The current apparatus administration method installs administration software in the administration system, which uses electronic mails (Email) or short message service (SMS) to inform the administrator of apparatus abnormalities. Notification by Email has following problems: while detecting an abnormality defined by the administrator, the administration system automatically sends out an Email to the mailbox of the administrator; however, the administrator may not open a new Email promptly; therefore, the normal situation is that the user of the apparatus notifies the administrator after the apparatus is unable to work; the time spent in repair in addition to the information lag would greatly delay the work. Notification by SMS has following problems: SMS is a unidirectional notification, unable to facilitate a bidirectional group discussion; thus, no one knows whether the repair manpower is sufficient, who will repair the apparatus, whether the apparatus is repaired instantly, or when the apparatus will be repaired.

Accordingly, the present invention proposes a system and method for transmitting apparatus-related information in real time to effectively solve the abovementioned problems. The principles and embodiments of the present invention will be described in detail below.

SUMMARY OF THE INVENTION

The primary objective of the present invention is to provide a system for transmitting apparatus-related information in real time, which uses a simple and instantaneous way to inform the administrator of the abnormality of an external apparatus, wherein the information is broadcasted vocally in real time, whereby the administrator can promptly learn and deal with the abnormality, wherefore the delay caused by Email or SMS is avoided.

Another objective of the present invention is to provide a system and method for transmitting apparatus-related information in real time, which assigns related persons for each external apparatus and establishes a notification group for the related persons, and which transmits information to the client devices of the notification group while an abnormality of an external apparatus occurs, whereby the related persons can interact and discuss using the communication software of the client devices no matter where they are, wherefore the repair schedule becomes transparent and easy to handle.

A further objective of the present invention is to provide a system and method for transmitting apparatus-related information in real time, which establishes reports of the abnormalities in the historical record according to key words or notations, or generates an instant report for the supervisor or all the related persons as soon as an abnormality is found.

To achieve the abovementioned objectives, the present invention proposes a system for transmitting apparatus-related information in real time, which comprises at least one server in signal communication with at least one external apparatus in a wired or wireless way. While an abnormality of an external apparatus occurs, the external apparatus transmits a set of abnormality information to the server. The server further comprises an information receiving interface, an information processing module, and an information transmitting module. The information receiving interface receives the set of abnormality information, which is transmitted by the external apparatus. The information processing module is in signal communication with the information receiving interface, processing the set of abnormality information and broadcasting the set of abnormality information vocally. The information transmitting module is in signal communication with the information processing module and the information receiving interface, transmitting the set of abnormality information to the client devices of at least one assigned related person. Thereby, the related persons can still see the warning notification of the abnormal state on the client devices if they do not hear the vocal broadcast.

In one embodiment, the information receiving interface, the information processing module and the information transmitting module are arranged in an identical server.

In one embodiment, the set of abnormality information, which is transmitted by the information transmitting module, is displayed by a instant messaging software installed in the client devices. The related persons can discuss the status of repairing the external apparatus on the client devices through the instant messaging software.

In one embodiment, after the information transmitting module transmits the set of abnormality information to the client devices, the set of abnormality information is presented on the client devices in a push notification way lest the related persons neglect the information.

In one embodiment, the client devices of the related persons are arranged into a group; the information transmitting module transmits the set of abnormality information to the client devices of the group.

In one embodiment, the information processing module is connected with a database, storing the abnormality information in the database; the database is connected with a vocal module; the vocal module retrieves the abnormality information, converting the abnormality information into vocal messages and broadcasting the vocal messages. In one embodiment, the vocal module includes a multilingual function, able to broadcast the abnormality information multilingually.

In one embodiment, the information transmitting module includes an automatic search module; the automatic search module generates a plurality of reports about the abnormalities according to the times at which abnormalities occur, including the statistic reports, instant reports, daily reports, weekly reports and monthly reports of abnormalities of external apparatuses.

In one embodiment, the set of abnormality information includes a plurality of pieces of information; the information receiving interface designates at least one piece of information with a notation; the automatic search module finds out the pieces of information marked with the notations from the set of abnormality information to establish the reports and transmits the reports to the client devices.

In one embodiment, the present invention further comprises monitoring modules connected with external apparatuses and transmitting the sets of abnormality information to the information receiving interface.

In one embodiment, the external apparatuses are industrial production machines or information devices; the client devices are intelligent phones, intelligent watches, tablet computers, desktop computers, or notebook computers.

The present invention also proposes a method for transmitting apparatus-related information in real time, which comprises steps: transmitting at least one set of abnormality information to a server while the abnormality of at least one external apparatus occurs; an information receiving interface of the server receiving the set of abnormality information; an information processing module, which is connected with the information receiving interface, vocally broadcasting the abnormality information in real time, and an information transmitting module, which is connected with the information receiving interface, transmitting the abnormality information to at least one client device of at least one assigned related person and presenting the information on the client device in a push notification way.

DETAILED DESCRIPTION OF THE INVENTION

Figure 1:
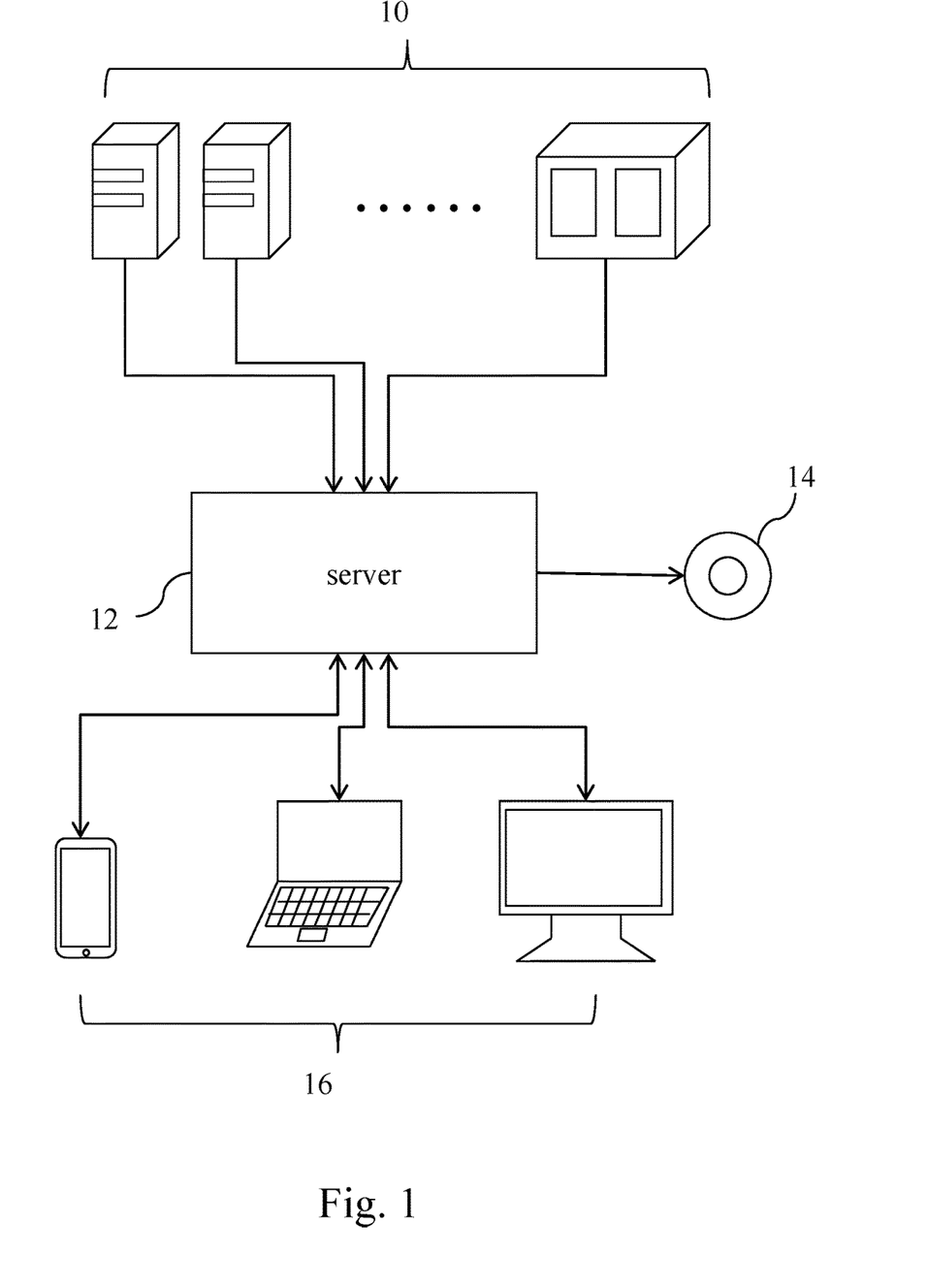
FIG. 1 is a diagram schematically showing the architecture of a system for transmitting apparatus-related information in real time according to one embodiment of the present invention.

The present invention provides a system and method for transmitting apparatus-related information in real time, which monitors operations of various external apparatuses and informs the related persons in real time while an external apparatus suffers an abnormality so as to repair the apparatus timely and prevent work from being delayed. FIG. 1 is a diagram schematically showing the architecture of a system for transmitting apparatus-related information in real time according to one embodiment of the present invention. In FIG. 1, at least one external apparatus 10 may be an industrial production machine or an information device. The information devices may be electronic products, such as servers, databases, wireless access points, websites, gateways, and routers. The industrial production machines may be critical machines for industrial production, such as robotic arms, press machines, and cutting machines. Therefore, malfunctions of the external apparatuses 10 must be solved as soon as possible. At least one server 12 is in signal communication with the external apparatuses 10 in a wired or wireless way. While the external apparatus 10 suffers an abnormality and sends out abnormality information, the server 12 uses speakers 14 to vocally broadcast the abnormality information in real time. Further, the server 12 instantly transmits the abnormality information to a client device 16 of at least one assigned related person. The details of notification will be described below.

Figure 2:
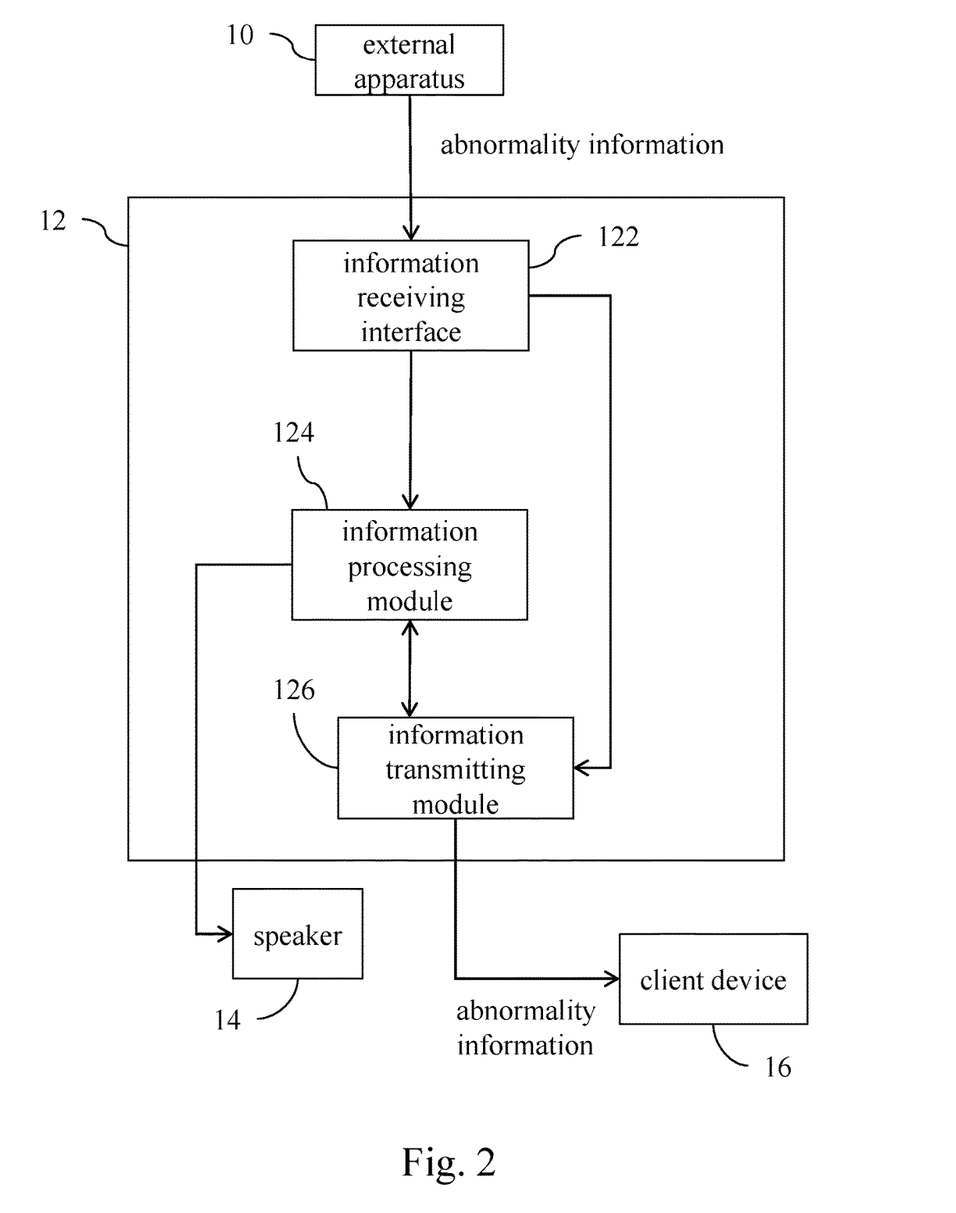
FIG. 2 is a block diagram schematically showing the architecture of a server of a system for transmitting apparatus-related information in real time according to one embodiment of the present invention.

Refer to FIG. 2 a block diagram schematically showing the architecture of a server of a system for transmitting apparatus-related information in real time according to one embodiment of the present invention. The server 12 comprises an information receiving interface 122, an information processing module 124, and an information transmitting module 126. In one embodiment, the information receiving interface 122 is integrated with the information processing module 124. The information processing module 124 is in signal communication with the information receiving interface 122. The information transmitting module 126 is in communication with the information processing module 124 and the information receiving interface 122. The information receiving interface 122 receives a set of abnormality information sent out by the external apparatus 10. The information processing module 124 instantly processes the set of abnormality information and broadcasts the set of abnormality information vocally. For example, the information processing module 124 broadcasts the abnormality information vocally through at least one speaker 14. In addition to announcing the abnormality information to the public through broadcasting, the server 12 uses the information transmitting module 126 to transmit the set of abnormality information to a client device 16 of at least one assigned related person. Thereby, the related persons can still see the warning notification of the abnormal state on the client devices 16 if they do not hear the vocal broadcast. Suppose the external apparatus 12 is a refrigerating cabinet of a supermarket. While the refrigerating cabinet suffers an abnormal temperature, the server 12 retrieves the abnormality information of the refrigerating cabinet and issues a vocal notification of the abnormality through the speakers 14. Simultaneously, the server 12 also transmits the abnormality information to the client devices 16 of the maintenance personnel.

Figure 3:
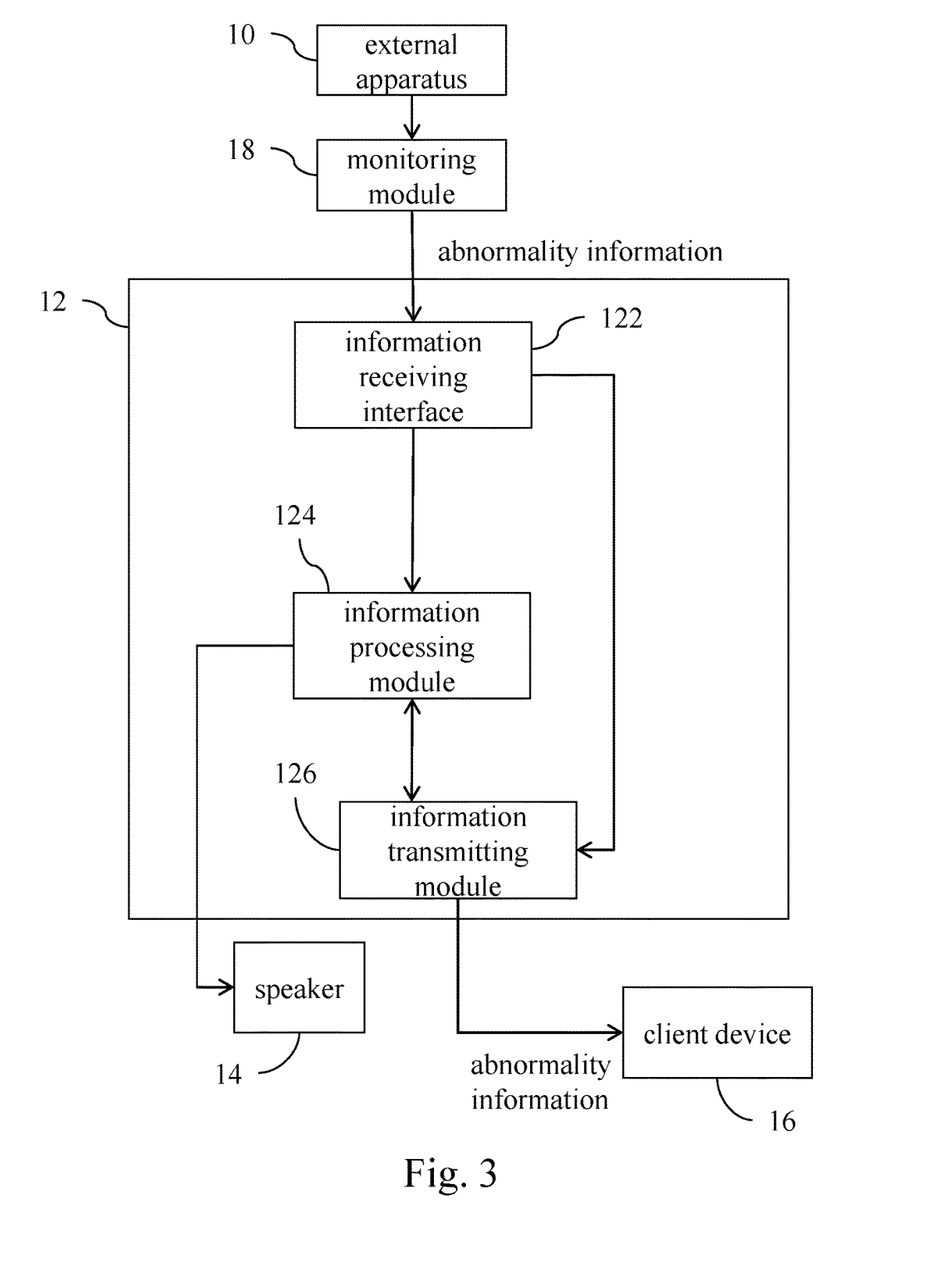
FIG. 3 is a block diagram schematically showing the architecture of a server of a system for transmitting apparatus-related information in real time according to another embodiment of the present invention.

Refer to FIG. 3 a block diagram schematically showing the architecture of a server of a system for transmitting apparatus-related information in real time according to another embodiment of the present invention. In some embodiments, the external apparatus 10 is connected with a monitoring module 18 for monitoring the state of the external apparatus 10. Once detecting an abnormality, the monitoring module 18 transmits a set of abnormality information to the information receiving interface 122 of the server 12. The monitoring module 18 is built in the external apparatus 10 or externally connected with the external apparatus 10. If the external apparatus 10 is an information apparatus, the monitoring module 18 may have a network management software installed therein, such as the Dude, Cacti, Nagios, or OpenNMS monitoring program. In some embodiments, the client devices 16 are electronic products, such as intelligent phones, intelligent watches, tablet computers, desktop computers, or notebook computers.

In some embodiments, the speakers 14 are arranged in different rooms of the related persons, such as supervisor rooms and information rooms. The speakers 14 are connected with the server 12. While detecting an abnormality, the monitoring module 18 transmits a set of abnormality information to the information receiving interface 122 of the server 12, the information receiving interface 122 transmits the abnormality information to the information processing module 124, the information processing module 124 converts the abnormality information into voices and broadcasts the voices through the speakers 14 in the offices of the related persons. For another example, suppose that the persons in a first information room are responsible for Apparatus A and that the persons in a second information room are responsible for Apparatus B; while Apparatus A malfunctions, only the speaker in the first information room broadcasts, and the speaker in the second information room does not broadcast.

In some embodiments, the abnormality information transmitted by the information transmitting module 126 is displayed by a instant messaging software installed in the client devices 16. The related persons can discuss the status of repairing the external apparatus 10 on the client devices 16 through the instant messaging software to learn who should undertake repair and how the repair is progressing. In one embodiment, after the information transmitting module 126 transmits the set of abnormality information to the client devices 16, the abnormality information is presented on the client devices 16 in a push notification way. Thereby, on turning on the screens of the client devices 16, the related persons can immediately see the abnormality information. Thus, the related persons would not miss the information.

In some embodiments, the client devices 16 of the related persons are arranged into a group, such as a Slack group. For example, the group responsible for maintaining Apparatus A includes several engineers and supervisors; while Apparatus A suffers abnormality, the information transmitting module 126 transmits the abnormality information to the client devices 16 of the group responsible for Apparatus A; thereby, all the related persons are immediately informed and able to interact with each other.

Figure 4:
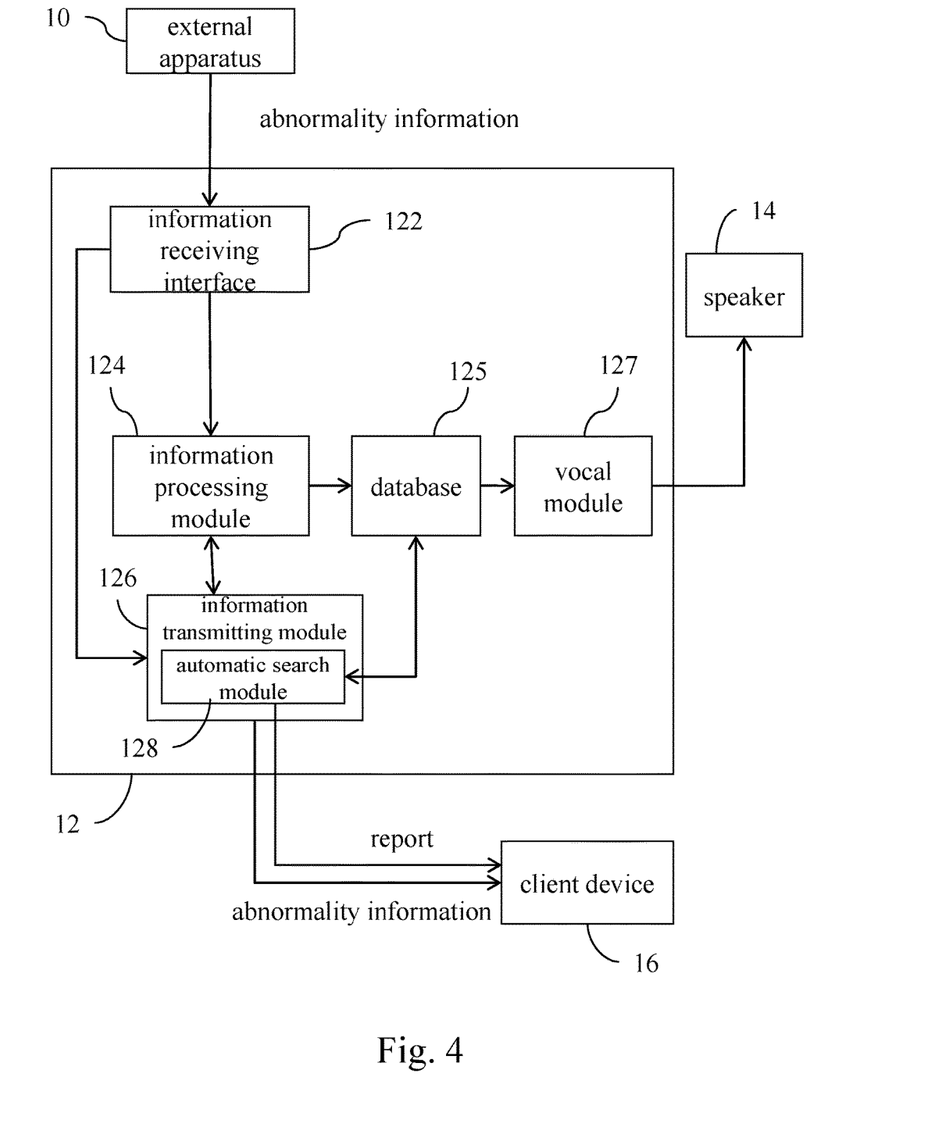
FIG. 4 is a block diagram schematically showing the architecture of a server of a system for transmitting apparatus-related information in real time according to yet another embodiment of the present invention.

Refer to FIG. 4 a block diagram schematically showing the architecture of a server of a system for transmitting apparatus-related information in real time according to yet another embodiment of the present invention. In the embodiment shown in FIG. 4, the system of the preset invention further comprises a database 125 and a vocal module 127. The database 125 is connected with the information processing module 124 and an automatic search module 128 of the information transmitting module 126, storing all the information of abnormalities having occurred so far. In this embodiment, the information transmitting module 126 is not connected with the speakers 14 but connected with the vocal module 127. The vocal module 127 retrieves the abnormality information from the database 125 and converts the abnormality information into voices. Then, the speakers 14 broadcast the voices. In some embodiments, the vocal module 127 retrieves the abnormality information once per minute, which is favorable for the case that there is a vast amount of information of abnormalities. If the information transmitting module 126 directly displays the information of abnormalities, the sound emitted by the speaker 14 will be noisy and confusing. In the case that the vocal module 127 retrieves the information of abnormalities from the database 125, the vocal module 127 can filter the information of abnormalities according to the severities of abnormalities and determine the information of abnormalities to be broadcast by speakers 14.

The automatic search module 128 searches the historical record stored in the database 125 according to keywords and generates a plurality of reports about the abnormality information according to the time points at which the abnormalities of the external apparatus occur, such as the statistic reports, daily reports, weekly reports, monthly reports and instant reports of abnormalities of the external apparatus, wherein the instant report is generated instantly after an abnormality occurs. Table.1 is an example of the instant reports.

TABLE 1

| External apparatus | Time point of abnormality occurring | Repair personnel | Time point of starting repair | Information of vendor |
|---|---|---|---|---|
| 172.16.1.1 | 3/8 13:30 | Shau-Ming Wang | 3/8 13:35 | vendor/personal name: Yezz Tec Tel: 2-2230-5220 email: support@yezz.com.tw |
| Core router of office | 3/9 13:31 | Da-Tung Fun | 3/9 13:40 | vendor/personal name: Yezz Tec Tel: 2-2230-5220 email: support@yezz.com.tw |
| Firewall 1 | 3/10 13:32 | Da-Kwai Cheng | 3/10 13:55 | vendor/personal name: Yezz Tec Tel: 2-2230-5220 email: support@yezz.com.tw |
| Firewall 2 | 3/11 13:33 | Don-Fun Lin | 3/11 14:10 | vendor/personal name: Yezz Tec Tel: 2-2230-5220 email: support@yezz.com.tw |
| 192.168.1.254 | 3/12 13:34 | Shau-Hwa Chang | 3/12 13:36 | vendor/personal name: Yezz Tec Tel: 2-2230-5220 email: support@yezz.com.tw |

Table.2 is an example of the statistic reports for apparatus abnormalities, wherein the search range can be determined by the user. In this embodiment, the search range is Feb. 1, 2017-Mar. 31, 2017.

TABLE 2

| External apparatus | Total number of abnormalities | Total time of durations of abnormalities (minute) | Details |
|---|---|---|---|
| 172.16.1.1 | 15 | 360 | Listed in related table |
| 172.16.1.2 | 10 | 361 | Listed in related table |
| 172.16.1.3 | 2 | 362 | Listed in related table |
| 172.16.1.4 | 4 | 100 | Listed in related table |
| 172.16.1.5 | 1 | 50 | Listed in related table |

While the user clicks on "Listed in related table" in Table.2, the related table will be presented. Table.3 is an example of the related tables.

TABLE 3

| Time point of abnormality occurring | Duration of abnormality (minute) | Information about abnormality |
| --- | --- | --- |
| 2017 Feb. 8 13:20 | 30 | port 1 error |
| 2017 Feb. 9 13:20 | 31 | port 2 error |
| 2017 Feb. 9 15:20 | 32 | port 3 error |
| 2017 Feb. 10 10:00 | 33 | port 4 error |
| 2017 Feb. 10 13:40 | 34 | port 5 error |
| 2017 Feb. 10 16:30 | 35 | port 6 error |
| 2017 Feb. 11 13:20 | 36 | port 7 error |
| 2017 Feb. 12 09:20 | 37 | port 8 error |

Another embodiment of reports is a statistic report of services provided by related persons. Table.4 is an example of the statistic report of services provided by related persons. The statistic report of services records the names of the persons responsible for dealing with abnormalities within a search range, the count of services of each person, the average time for a response made by each person on learning an abnormality, and the total time each person spends in all services for removing abnormalities.

TABLE 4

| Name | Count of services | Average time for response (minute) | Total time of services (minute) | details |
| --- | --- | --- | --- | --- |
| BOB | 15 | 10 | 360 | Listed in related table |
| IVY | 10 | 5 | 361 | Listed in related table |
| Sean | 2 | 10 | 362 | Listed in related table |
| Chandler | 4 | 3 | 100 | Listed in related table |
| Edison | 1 | 1 | 50 | Listed in related table |

The search range can be determined by the user. In this embodiment, the search range is Feb. 1, 2017-Mar. 31, 2017. While the user clicks on "Listed in related table" in Table.4, the related table will be presented. Table.5 is an example of the related tables, showing the details of services provided by BOB.

TABLE 5

| Time point of abnormality occurring | Time for response (minute) | Time of service (minute) |
| --- | --- | --- |
| 2017 Feb. 8 13:20 | 10 | 30 |
| 2017 Feb. 9 13:20 | 10 | 30 |
| 2017 Feb. 10 13:20 | 10 | 30 |
| 2017 Feb. 11 13:20 | 10 | 30 |
| 2017 Feb. 12 13:20 | 10 | 30 |
| 2017 Feb. 13 13:20 | 10 | 30 |
| 2017 Feb. 14 13:20 | 10 | 30 |
| 2017 Feb. 15 13:20 | 10 | 30 |

While searching the database, the automatic search module will finds out the information carrying notations to establish a report and then transmits the report to the client devices to present the information. For the example in Table.5, the time point of abnormality occurring and the time point of response are marked; after the related person has solved the problem of abnormality, the information receiving interface will record the time point at which the external apparatus is restored to the normal state and use the time point of response and the time point of restoring the external apparatus to the normal state to work out the time of a service.

Figure 5:
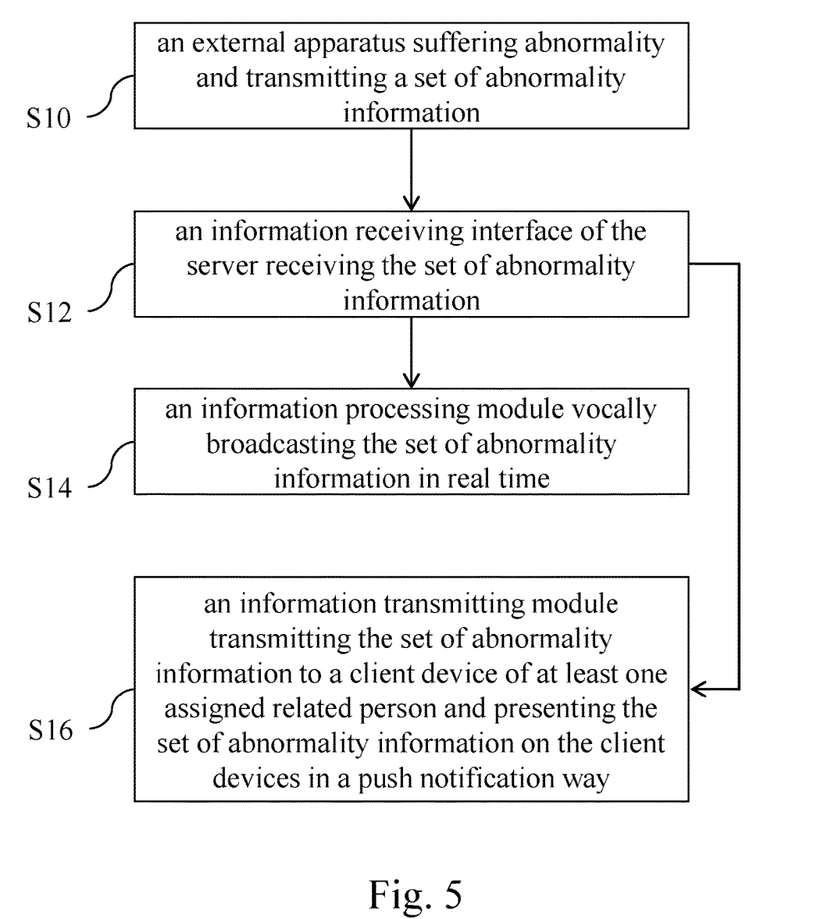
FIG. 5 shows a flowchart of a method for transmitting apparatus-related information in real time according to one embodiment of the present invention.

Refer to FIG. 5 showing a flowchart of a method for transmitting apparatus-related information in real time according to one embodiment of the present invention. In Step S10, an external apparatus suffers an abnormality and transmits at least one set of abnormality information to a server. In Step S12, an information receiving interface of the server receives the set of abnormality information. In Step S14, an information processing module vocally broadcasts the abnormality information in real time to make all the related persons able to hear the broadcast of the state of the external apparatus. Step S16 is undertaken simultaneously with Step S14. In Step S16, an information transmitting module transmits the abnormality information to at least one client device of at least one assigned related person and presents the information on the client devices in a push notification way to guarantee that the persons responsible for the external apparatus can receive the information.

In some embodiments, the system of the present invention includes a multilingual function able to switch among a plurality of languages. The user sets the desired language in the client device thereof, and the setting is stored in the information processing module of the server. The information transmitted to the user will be presented in the specified language. The present invention is applicable to a multinational industry. For example, the factory is located in Thailand; the displayed text and the broadcast voices for the natives use Thai; the text, which a foreign supervisor views on his own client device, uses a language set by the supervisor himself, such as traditional Chinese; thus, the system transmits the abnormality information and reports to the supervisor in traditional Chinese. Therefore, as long as linking the client device to the server, the boss can look up reports, check the operational states of external apparatuses, and evaluate the repair efficiencies of the related personnel, anytime no matter where he is. In some embodiments, the vocal module of the server has a multilingual function, and a plurality of languages is installed in the vocal module beforehand. While External Apparatus A sends out abnormality information, the vocal module broadcasts the information in the language assigned to External Apparatus A. For example, External Apparatus A is located in USA; thus, English is assigned to External Apparatus A. In this embodiment, the language of text is set in the client device, and the language of voices is set in the vocal module of the server. Therefore, it is probable in this embodiment that text in a client device is English and voices of broadcast is Japanese.

In conclusion, the present invention provides a system and method for transmitting apparatus-related information in real time, which can simultaneously monitor a plurality of external apparatuses, wherein the external apparatuses may be of different types. While an external apparatus suffers an abnormality, the present invention vocally broadcasts the information of abnormality in real time. Therefore, the present invention uses a simple and instantaneous way to notify the administrators of the external apparatuses. Thus, the administrators can learn and solve the abnormality promptly, exempted from the delay resulting from Email or SMS. Synchronously with broadcasting, the present invention also transmits the information of abnormality to the client devices of the related group in a push notification way, whereby the related persons can discuss the problem using a communication software no matter where they are. Thus, the progress of repair becomes more transparent and easy to grasp. Further, the present invention stores all the information of abnormalities as historical records. After the user determines the search range, the present invention can provide reports for the supervisors and all the related persons. The present invention can also provide instant reports as soon as an abnormality occurs to let the engineers know whether the corresponding external apparatus malfunctioned too frequently and the lengths of the time for dealing with the malfunctions and let the supervisors know whether the malfunctioning apparatus is repaired instantly and who repairs it. Therefore, the present invention is much favorable for the overall management of the external apparatuses and the personnel.

The embodiments described above are only to exemplify the present invention but not to limit the scope of the present invention. Any equivalent modification or variation according to the characteristic or spirit of the present invention is to be included within the scope of the present invention.

What is claimed is:

1. A system for transmitting apparatus-related information in real time, comprising
    at least one server in signal communication with at least one external apparatus in a wired or wireless way, wherein while an abnormality of said external apparatus occurs, said external apparatus transmits a set of abnormality information to said server, and wherein said server further comprises
        an information receiving interface receiving said set of abnormality information transmitted by said external apparatus;
        an information processing module in signal communication with said information receiving interface, processing said set of abnormality information, and vocally broadcasting said set of abnormality information in real time; and
        an information transmitting module in signal communication with said information processing module and said information receiving interface, transmitting said set of abnormality information to a client device of at least one of assigned related persons.

2. The system for transmitting apparatus-related information in real time according to claim 1, wherein said information receiving interface, said information processing module, and said information transmitting module are jointly disposed in said server.

3. The system for transmitting apparatus-related information in real time according to claim 1, wherein said set of abnormality information transmitted by said information transmitting module is presented through a instant messaging software installed in said client device, and said related persons discuss a status of repairing said external apparatus through said instant messaging software of said client devices.

4. The system for transmitting apparatus-related information in real time according to claim 1, wherein said information transmitting module transmits said set of abnormality information to said client device and presents said set of abnormality information on said client device in a push notification way.

5. The system for transmitting apparatus-related information in real time according to claim 4, wherein said client devices of said related persons are arranged into at least one group, and said information transmitting module transmits said set of abnormal information to said client devices of said group.

6. The system for transmitting apparatus-related information in real time according to claim 1, wherein said client devices of said related persons are arranged into at least one group, and said information transmitting module transmits said set of abnormal information to said client devices of said group.

7. The system for transmitting apparatus-related information in real time according to claim 1, wherein said information processing module is connected with a database and stores said set of abnormality information in said database.

8. The system for transmitting apparatus-related information in real time according to claim 7, wherein said database is connected with a vocal module, and wherein said vocal module retrieves said set of abnormality information from said database and converts said set of abnormality information into voices for broadcasting.

9. The system for transmitting apparatus-related information in real time according to claim 8, wherein said vocal module includes a multilingual function able to broadcast said set of abnormality information multilingually.

10. The system for transmitting apparatus-related information in real time according to claim 7, wherein said information transmitting module includes an automatic search module generating a plurality of reports for different said external apparatuses according to time points at which abnormalities of said external apparatuses occur, including statistic reports, instant reports, daily reports, weekly reports and monthly reports of said abnormalities of said external apparatuses.

11. The system for transmitting apparatus-related information in real time according to claim 1, wherein said set of abnormality information includes a plurality of pieces of information, and wherein said information transmitting module marks at least one of said pieces of information with a notation, and wherein an automatic search module is installed in said information transmitting module, and wherein said automatic search module finds out said pieces of information, which are marked with said notations, from said set of abnormality information to establish said reports and transmits said reports to said client devices.

12. The system for transmitting apparatus-related information in real time according to claim 1 further comprising a monitoring module connected with said external apparatus and transmitting said set of abnormality information to said information receiving interface.

13. The system for transmitting apparatus-related information in real time according to claim 12, wherein said external apparatus is an industrial production machine or an information device.

14. The system for transmitting apparatus-related information in real time according to claim 1, wherein said external apparatus is an industrial production machine or an information device.

15. The system for transmitting apparatus-related information in real time according to claim 1, wherein said client device is an intelligent phone, an intelligent watch, a tablet computer, a desktop computer, or a notebook computer.

16. A method for transmitting apparatus-related information in real time, comprising steps:
    transmitting at least one set of abnormality information to a server while an abnormality of at least one external apparatus occurs;
    an information receiving interface of said server receiving said set of abnormality information; and
    an information processing module, which is connected with said information receiving interface, vocally broadcasting said set of abnormality information in real time, and an information transmitting module, which is connected with said information receiving interface, transmitting said set of abnormality information simultaneously with said broadcasting to at least one client device of at least one assigned related person and presenting said set of abnormality information on said client devices in a push notification way.

17. The method for transmitting apparatus-related information in real time according to claim 16, wherein said set of abnormality information transmitted by said information transmitting module is presented through a instant messaging software installed in said client device.

18. The method for transmitting apparatus-related information in real time according to claim 17, wherein said related persons discuss a status of repairing said external apparatus through said instant messaging software of said client devices.

19. The method for transmitting apparatus-related information in real time according to claim 16, wherein said information processing module stores said set of abnormality information in a database.

20. The method for transmitting apparatus-related information in real time according to claim 19, wherein said information transmitting module includes an automatic search module searching said database for information of different said external apparatuses and generating a plurality of reports about abnormality information according to time points at which abnormalities of said external apparatuses occur, including statistic reports, instant reports, daily reports, weekly reports and monthly reports of said abnormalities of said external apparatuses.

* * * * *